United States Patent [19]

Collins et al.

[11] Patent Number: 5,241,653
[45] Date of Patent: Aug. 31, 1993

[54] APPARATUS AND METHOD FOR ADJUSTING AND DISPLAYING SCALED, RASTERIZED CHARACTERS

[75] Inventors: Harry J. Collins; Christopher R. Hassett, both of Nashua, N.H.

[73] Assignee: Adobe Systems Incorporated, Mountain View, Calif.

[21] Appl. No.: 509,359

[22] Filed: Apr. 12, 1990

[51] Int. Cl.⁵ .................................. G06F 15/62
[52] U.S. Cl. ........................... 395/139; 395/151
[58] Field of Search ............ 395/139, 141, 150, 151; 358/455

[56] References Cited

U.S. PATENT DOCUMENTS

| | | | |
|---|---|---|---|
| 4,179,824 | 12/1979 | Marsh | 395/139 X |
| 4,675,830 | 6/1987 | Hawkins | 395/139 X |
| 4,785,391 | 11/1988 | Apley et al. | 395/150 |
| 4,937,761 | 6/1990 | Hassett | 395/150 |
| 4,974,172 | 11/1990 | Nakai | 395/141 X |
| 5,010,497 | 4/1991 | Shimada | 358/455 |
| 5,050,103 | 9/1991 | Schiller et al. | 364/521 |

*Primary Examiner*—Mark K. Zimmerman
*Attorney, Agent, or Firm*—Roger S. Borovoy; David J. Larwood

[57] ABSTRACT

An apparatus and method of modifying graphic character images to preserve aesthetic aspects of such images involves manipulation of fractional pixel errors resulting from the transformation of a character image from conformance with a matrix of a first resolution to conformance with a matrix of a second resolution or output device-specific matrix. Fractional pixel errors are saved and processed for integrating into a character image while controlling the transformation and outline drawing of the character image with respect to the output device-specific matrix.

2 Claims, 11 Drawing Sheets

PRIOR TO GRID CORRECTION

*FIGURE 1A*

AFTER GRID CORRECTION

```
LINE(0,640)    ; Relative line draw to top of 'E'
LINE(400,0)    ; Top of upper stem
LINE(0,-80)    ; Descend upper stem width
LINE(-320,0)   ; Done drawing upper stem
LINE(0,-200)   ; Upper counter
LINE(320,0)    ; Top of middle stem
LINE(0,-80)    ; Descend middle stem width
LINE(-320,0)   ; Done drawing middle stem
LINE(0,-200)   ; Lower counter
LINE(320,0)    ; Top of lower stem
LINE(0,-80)    ; Descend middle stem width
LINE(-400,0)   ; 'E' is finished
```

| | | |
|---|---|---|
| LINE(0,280) | ; Get the first error |
| SAVE_Y0 | ; Save the first error |
| LINE(0,280) | ; Get the second error |
| SUB_Y0 | ; First subtract out the first error |
| SAVE_Y1 | ; Now we have the second error |
| SUB_Y1 | ; And now the top stem will be shifted down |
| LINE(0,80) | ; We're at the top of the 'E' |
| LINE(400,0) | ; Draw out to right corner of upper stem |
| LINE(0,−80) | ; Descend upper stem width |
| LINE(−320,0) | ; Finish upper stem |
| ADD_Y1 | ; Unshift the coordinate space, add error back |
| LINE(0,−200) | ; Define upper counter |
| LINE(320,0) | ; Top of middle stem |
| LINE(0,−80) | ; Descend middle stem width |
| LINE(−320,0) | ; Finish middle stem |
| ADD_Y0 | ; Unshift the coordinate space, add error back |
| LINE(0,−200) | ; Define lower counter |
| LINE(320,0) | ; Top of lower stem |
| LINE(0,−80) | ; Descend lower stem width |
| LINE(−400,0) | ; End of the 'E' |

*FIGURE 7C*

FIGURE 8C OPTIMAL DISPLAY

FIGURE 8B FLATTENED CURVE

FIGURE 8A WIDOWED PIXEL

APPARATUS AND METHOD FOR ADJUSTING AND DISPLAYING SCALED, RASTERIZED CHARACTERS

FIELD OF THE INVENTION

The present invention relates to graphic image processing systems and, in particular, to character image modification for the preservation of aesthetic appeal.

BACKGROUND OF THE INVENTION

The application of digital computer technology to graphic image and character generation and manipulation has provided numerous advantages and advances over prior technologies relating to graphics processing. In the areas of text image processing or typesetting, digital technology has borne productivity advances in the form of increased setting speed and creativity enhancement in the form of electronic manipulation.

Digital systems for creating and manipulating characters and other graphical objects generally involve: storing a digital representation of character images; retrieving the digital representations and transforming them to conform to a generalized size-independent coordinate system or matrix; manipulating the digital representations in relation to the generalized matrix; transforming the manipulated digital representations to conform to a second output-device-specific coordinate system or matrix; and rasterizing and physically embodying the digital representations for presenting the character images represented, in accordance with the output-device-specific matrix.

The storing of character images as digital representations involves the use of digital masters, which are typically high resolution bitmaps or outline or control point and vector data generated by digital type manufacturers. Digital masters are available for digitally representing a multiplicity of fonts and sizes.

The digital representations are typically stored and retrieved from a storage means by digital hardware and transformed to conform to a generalized matrix defined by hardware or software having the capability of executing operator-initiated manipulations of the digitally represented character images. Manipulations such as rotating, scaling and obliquing or slanting may be performed on the digital representations in accordance with the generalized matrix to which they conform in the digital hardware.

The desire to output the digital representations in the form of character images on a raster image device, requires that another transformation of the digital representations take place. The character image digital representation conforming to the generalized matrix must be transformed, by scaling and bit mapping or quantizing the image to conform to the coordinate system of the raster image device, whether it be a laser printer, dot matrix printer, pen plotter, video display terminal or the like. Almost universally, scaling and quantizing for output to a raster image device involves transformation from a high resolution (of the digital master and generalized matrix) to a lower resolution (of raster image devices). Such transformation introduces a number of problems.

Figure 1A:
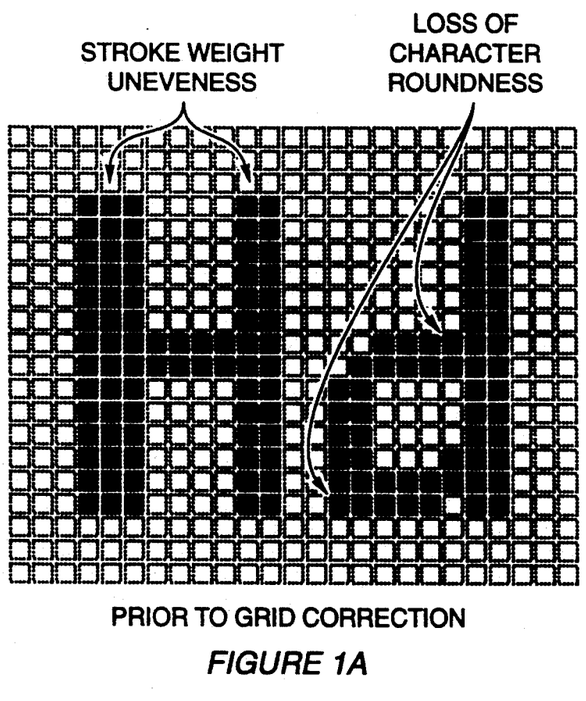
FIG. 1A is a rasterization of character images prior to grid correction.

The bit mapped character image digital representation scaled to conform to the output device-specific matrix, applied to a grid of picture elements (pixels) of lower resolution than the master, may result in a coarse rendering of the image. Where there is not a one-to-one or integer multiple relationship of elements in the transformation from the generalized matrix to the raster image device matrix, transformation errors result and may affect aesthetic features of the character image. Often, scaling produces fractional pixel errors wherein image outline features do not correspond directly to available pixels, causing either too many or too few pixels to be activated. At certain rendering sizes such fractional pixel errors result in undesirable aesthetic consequences including character stroke weight uneveness and loss of character roundness, as illustrated in FIG. 1a.

Known techniques implemented to solve character rendering problems have introduced, at the system level, a concomitant set of undesirable consequences. It is known in the art, to provide additional data with the digital representation of character images. The additional data defines relationships between features of a character image and implements rules providing for the maintenance of those relationships. The additional data defines character image features in terms of "zones". By application of the stored rules the system will "stretch" or "compress" particular character features or contours within zones, to bring specified contours into proper or aesthetically acceptable alignment with the bit mapped grid negating the effects of and discarding fractional pixel errors. Such "piece-wise linear transformation" is highly code and computation intensive, requiring significant additional resources in terms of storage capacity and transformation computation time.

Exacerbating the inherent inefficiency and undesirability of the techniques known in the art, is the attempt by those implementing such techniques to avoid redundancy of additional data and to maintain the relational aspects of character features among characters in a font, by constructing either linked character description data structures or massive global data bases containing character descriptions and relational rules. In some instances a character's features are defined in terms of the relationships of another character's features. The end results are involuted data structures demanding significant amounts of storage capacity and representing exorbitant amounts of system overhead in terms of processor cycles. System performance is, obviously, adversely impacted.

Furthermore, the accessing of large amounts of data which is relational and linked, forces batch-like processing because the data is necessary for determining how generalized transformation and scaling of the entire character are to be performed. In the case of highly relational and linked data a non-selected character may have to be processed in order to access features and relationships for a selected character. Such a batch-like technique may preclude a pipelined architecture to enhance processing speed.

SUMMARY OF THE INVENTION

According to the present invention an apparatus and method of modifying character images to preserve aesthetic aspects of such images involves manipulation of fractional pixel errors resulting from the transformation of a character image from conformance with a matrix of a first resolution to conformance with a matrix of a second resolution or output device-specific matrix.

In further accord with the invention, fractional pixel errors are saved and processed for integrating into a character image while controlling the transformation and outline drawing of the character image with respect to the output device-specific matrix.

Features of the invention include providing simplified character image modification which avoids code and computation intensive data base accesses and the associated costs in computation time and system requirements.

An additional feature, according to the invention, is the provision of a method and apparatus for modifying character images which is compatible with a pipelined system for enhanced speed image processing.

BRIEF DESCRIPTION OF THE DRAWING

These and other features and advantages of the present invention will become more apparent in light of the following detailed description of an illustrative embodiment thereof, as illustrated in the accompanying drawings, of which.

DETAILED DESCRIPTION

Figure 1B:
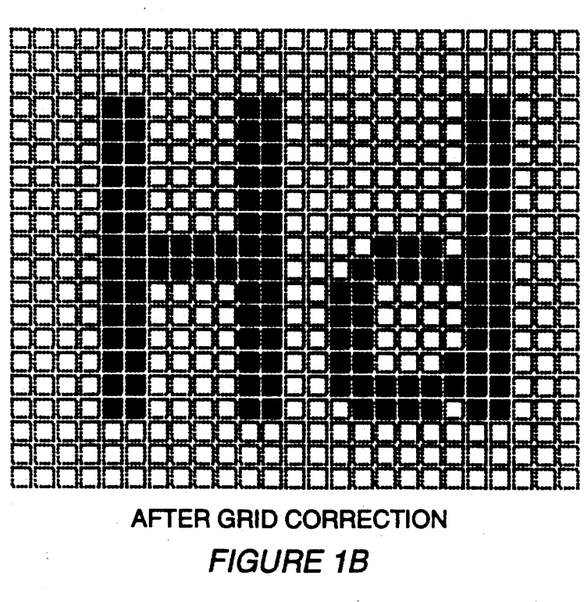
FIG. 1B is a rasterization of the characters of FIG. 1A after grid correction.

FIG. 1A illustrates the distortions that can result in transforming a high resolution character image outline to conform to a lower resolution output device-specific matrix or grid. The degradation of the character image must be corrected by a grid correction technique to preserve typographic appeal, as has been done in FIG. 1B, which illustrates the end result of applying grid correction according to the invention.

Figure 2:
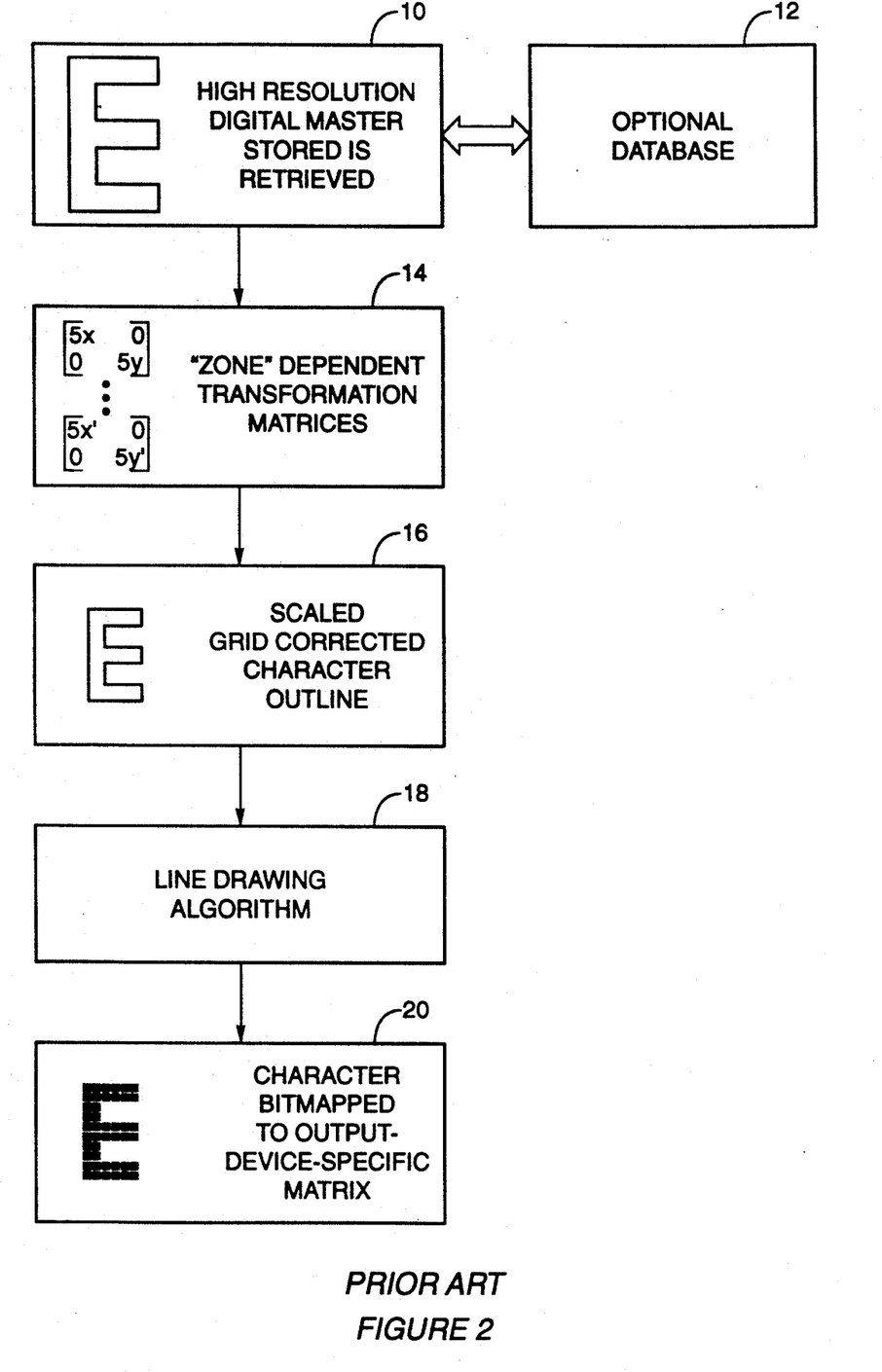
FIG. 2 is a generalized flow diagram of character image transformation according to the prior art.

Typically, referring now to FIG. 2, a particular font is digitally stored as a high resolution master and retrieved 10 by image processing hardware. Additional data indicative of character features and relationships which must be altered or maintained as a particular character is scaled, depending on the implementations known in the art, may be stored either embedded among the data describing character outlines, or separately, as a global data structure 12 defining all the features and relationships of and among characters of a font. In either case, character outline data and additional relationship data is stored, retrieved and must be interpreted, usually by a general purpose (i.e., Von Neuman) microprocessor. The outline and relationship data is usually resolved to effect a change in transformation matrices 14 according to a hierarchy of "zones". Depending upon the zone that a particular character feature falls into at a given scale factor and depending upon where a particular zone is in the hierarchy, a character feature or relationship may be sacrificed in order to preserve others.

Processing outline and relationship data structures in accordance with various transformation matrices generated relative to respective zones results in a character outline 16 which has the desired outline features aligned on a lower resolution matrix.

This grid-corrected scaled character outline is then typically processed through a line drawing algorithm 18 and bit-mapped 20 to a storage means in accordance with a particular raster image device coordinate system or matrix on which the character may be displayed (e.g., laser printer, video terminal, etc.).

Figure 3:
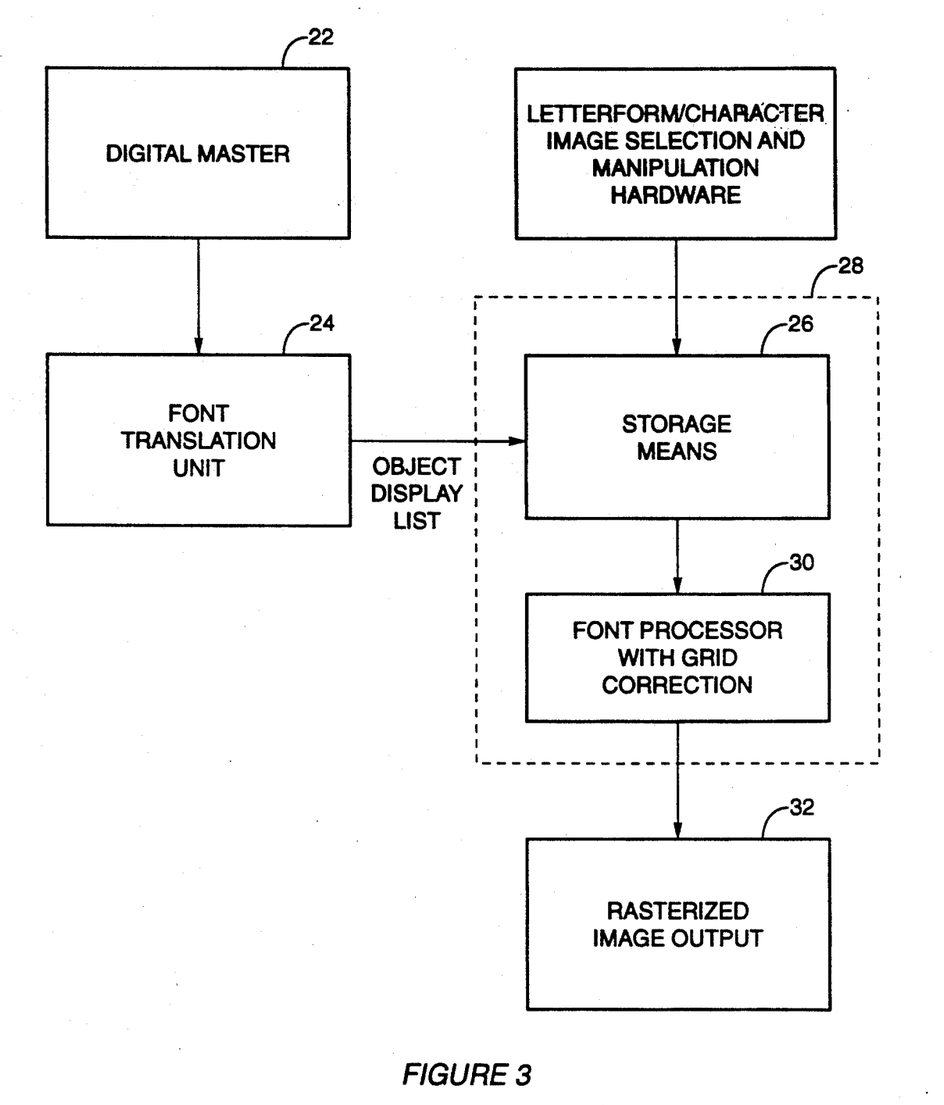
FIG. 3 is a block diagram of a graphic image processing system incorporating grid correction according to the invention.

A grid correction technique, according to the invention, is generally illustrated in FIG. 3. The technique is implemented in the context of a graphic image processing system comprising high resolution digital masters as discussed hereinbefore.

For the purpose of grid correction and enhanced speed image processing according to the invention, the digital master 22 is processed through a font translation unit 24 which is effectively a cross compiler. The font translation unit 24 processes the digital master, which identifies character features to be controlled during scaling, interspersing fractional pixel error manipulation instructions in the character outline description in accordance with the features identified in the master.

The cross compiled code output from the font translation unit 24, referred to as an object display list, is transferred to storage means 26 resident in the raster image device 28. A font processor 30 with grid correction implemented according to the invention, reads the object display list, processing fractional pixel error manipulation instructions as the object is transformed, thereby generating and manipulating characters and graphics which ultimately appear as grid-corrected rasterized image output 32.

Font processor 30 operates in a manner described in detail in copending commonly assigned application Ser. No. 07/117,208, now issued Jun. 26, 1990 as U.S. Pat. No. 4,937,761, entitled METHOD AND APPARATUS FOR ENHANCED SPEED GRAPHIC IMAGE PROCESSING, incorporated in full herein by reference. The font processor reads the object display list from storage means and generates control points for each graphic primitive (i.e., lines and arcs) and maps the control points according to a first coordinate system to construct a complete high resolution character image. In a transformation stage the font processor performs any specified manipulations on the control points of the generated character or graphic in accordance with the first coordinate system. Transformation typically involves scaling of the generated character or graphic and it is at this point that the fractional pixel error manipulation instructions interspersed in the character outline description are implemented.

Figure 4A:
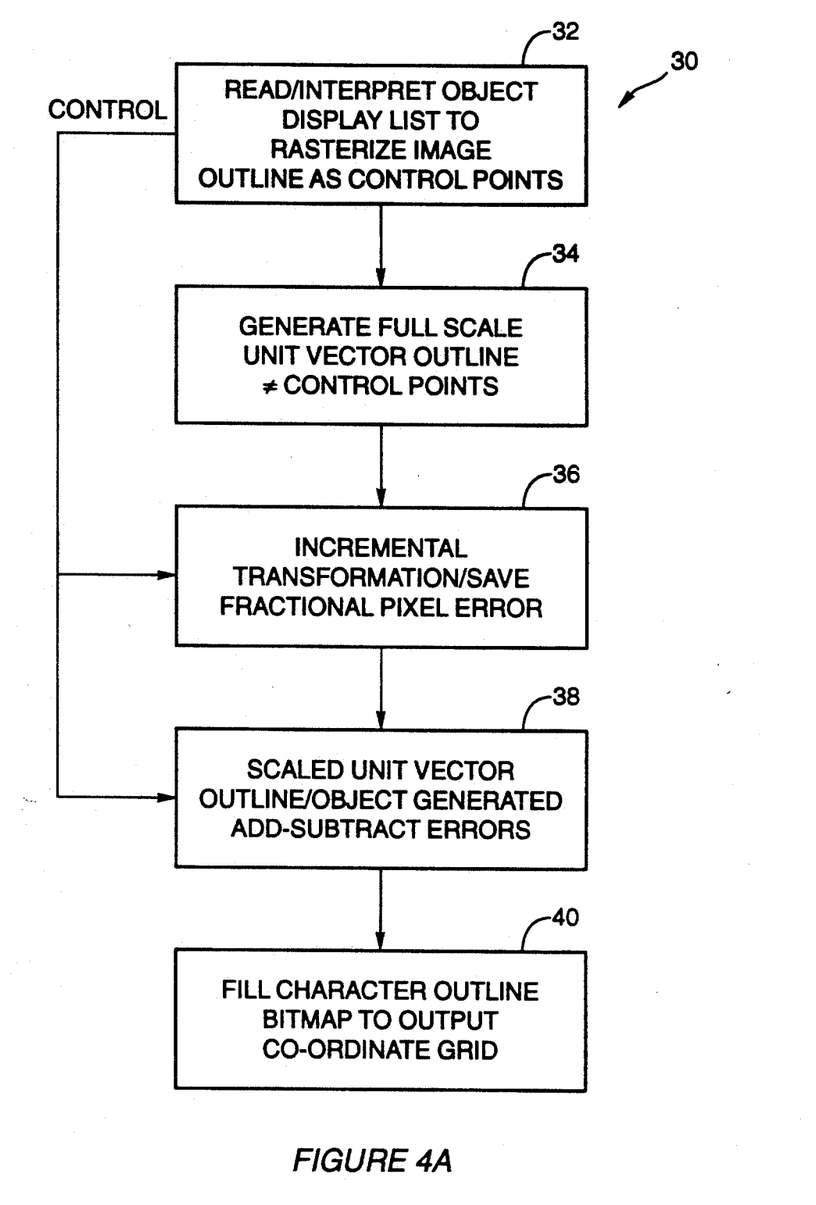
FIG. 4A is a block diagram of an implementation of grid correction according to the invention.

FIG. 4A presents an embodiment of the grid correction technique implemented as described hereinafter. The font processor 30 reads the object display list and interprets 32 the list having interspersed fractional pixel error instructions, in order to rasterize the object image outline. A full scale unit vector outline is generated 34 and comprises line and arc graphic primitives in the form of vectors where maximum travel by any vector is equal to ±1 vector in any direction specified at 45° intervals. The graphic primitives defining the outline may also be line and bezier curve information to be processed into the unit vector outline indicating the path traced to achieve an object or character outline. The unit vector outline is processed through incremental transformation 36, as discussed in the referenced application, to generate a scaled unit vector outline 38 according to the second or output coordinate space resolution. A by-product of incremental transformation 36 is an error or fractional pixel error equivalent to the deviation from the true curve or line necessary to generate a pixel in the scaled or lower resolution output coordinate space. The scaled unit vector outline processed through a graphic element or object generator 38 generates a complete outline of the object. The information saved as fractional pixel errors in the incremental transformation stage becomes critical at the object generation stage as the character or object outline generated, conforms to rules implemented for the preservation of typographic or graphic aesthetics, which take into consideration or operate in accordance with the fractional pixel errors generated and saved during incremental transformation. Such rules, coded into the object display list and applied in object outline generation, control the character outline by arithmetic operation on the fractional pixel errors, to be discussed hereinafter. Subsequently, the scaled and fully generated outline is filled and bit-mapped to an output coordinate space or grid 40, as known in the art.

Figure 4B:
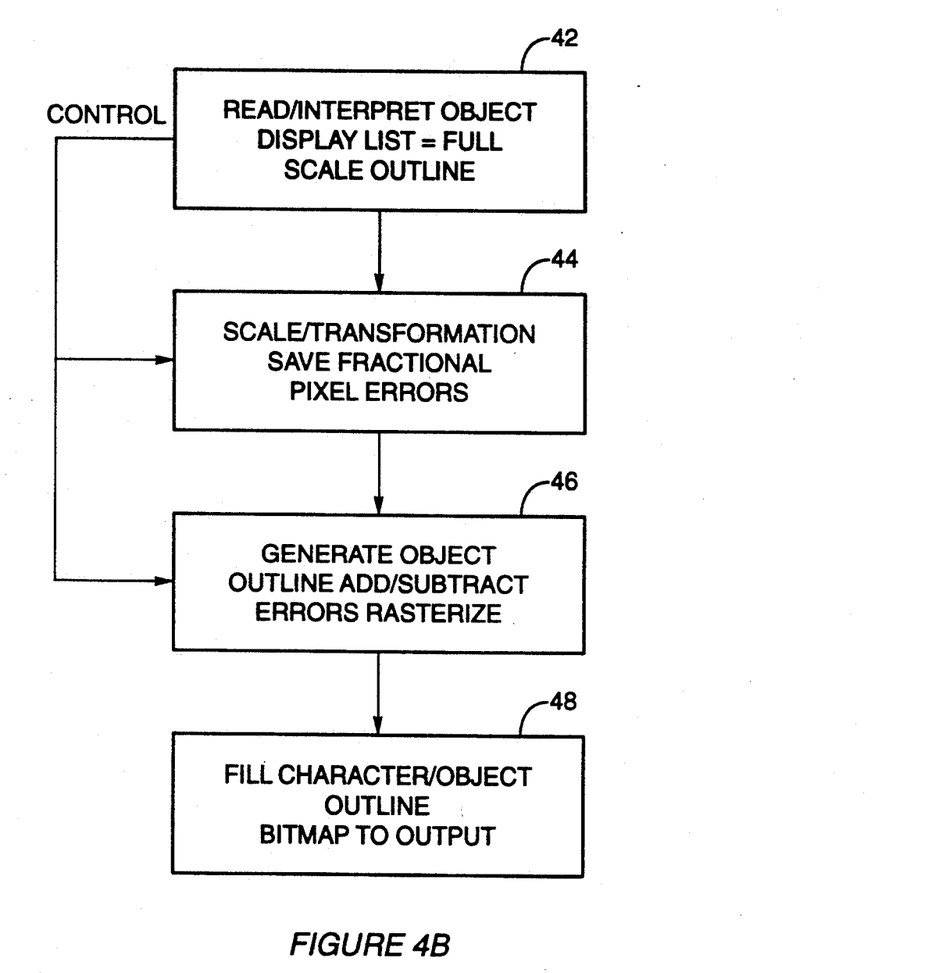
FIG. 4B is a block diagram of another implementation of grid correction according to the invention.

Alternatively, referring now to FIG. 4B, grid correction according to the invention may be incorporated in a rasterization process which operates on a full scale character outline rather than a unit vector outline. Such a process would entail, as in the process of FIG. 4A, reading and interpreting 42 an object display list which defines character features and contains therein instructions for saving and mathematically manipulating fractional pixel errors in order to preserve aesthetic integrity of the object as it is rasterized to a lower resolution grid. Control would be provided to a transformation engine 44 to assure saving of fractional pixel errors for manipulation during the generation of the object outline by a rasterization engine 46. Such an embodiment would further require character/object outline filling and bit-mapping 48 to a raster image output matrix. The technique of grid correction employed, however, would not change and would be as described.

The list of potential fonts characters and relationships therein and among is limitless, therefore grid correction according to the invention is exemplarily disclosed hereinafter with respect to a single style and letter "E", but is not intended to be limited in application thereto.

The manipulation of fractional pixel errors during rasterization of character outline descriptions, to fix distortions that would normally occur during rasterization, involves two methods of manipulating fractional pixel errors mathematically. These methods, edge locking and apogee locking, are effective to fix a broad range of typographic distortions and are implemented by a series of error manipulations which in combination effect rules that deal with typographic effects that may vary widely for different fonts and characters. The software creating the font program or object display list places the error manipulation instructions in the character outline in such a way as to optimize the aesthetic nature and legibility of the character. The complex rules for doing such are generally known in the art of type manufacture and may involve specifying features of a character that are to be scaled consistently, as well as specifying how these features relate to the features of other characters in a font. Such a rule might provide for example, that the vertical stems of the uppercase "H" should be the same as the uppercase "P" when they are both being rasterized at sizes less than 100 lines-per-em. Another rule providing the additional constraint that the stems of the "H" match the stems of the lower case "n" may be necessary for scale factors resulting in rasterization at less than 28 lines-per-em. Again, these exemplary and other font and rasterization-specific rules are implemented, according to the invention by a series of error manipulations that result in edge locking and apogee locking which will produce the desired aesthetic effect.

Figure 5:
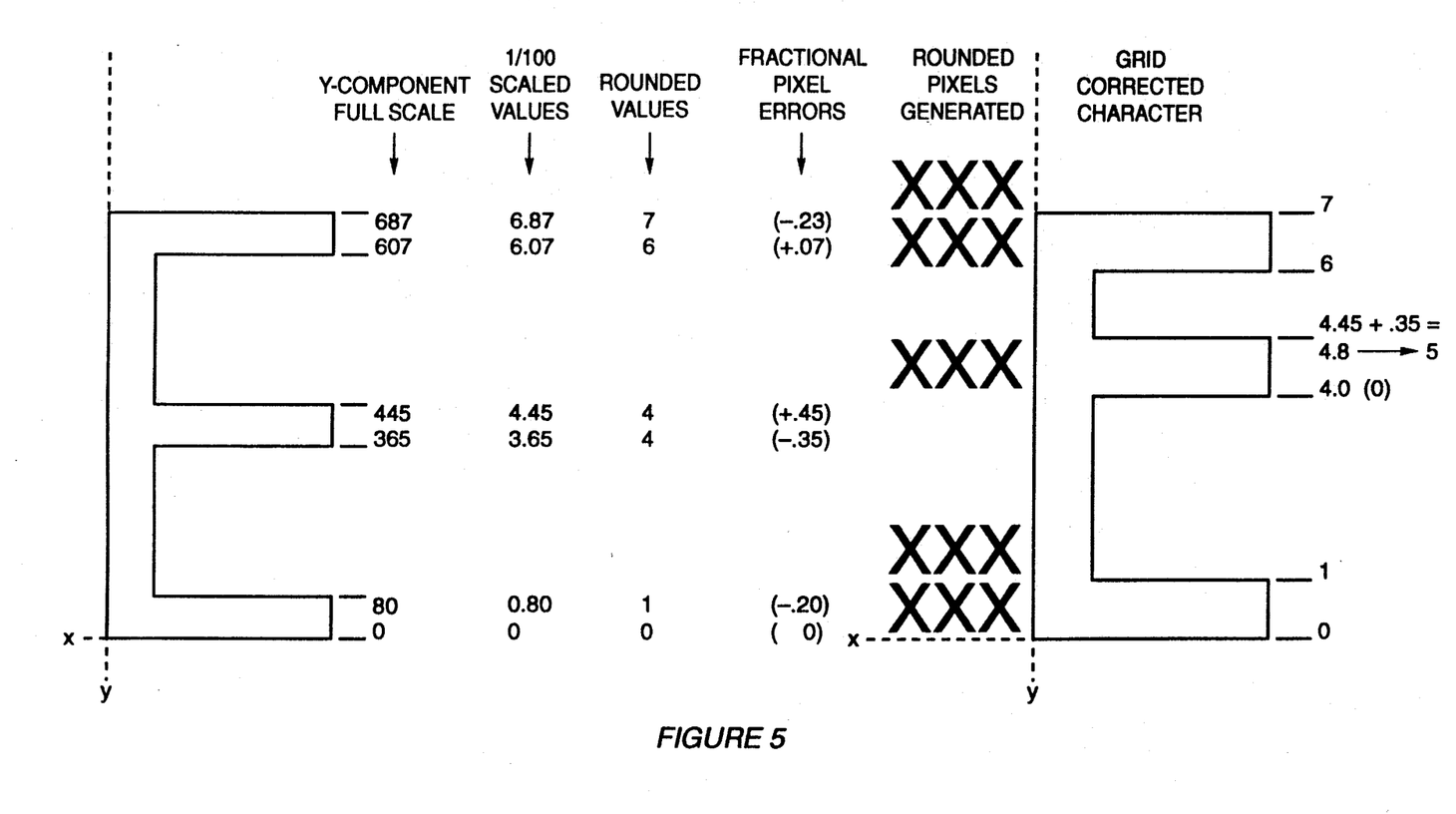
FIG. 5 is a character coordinate representation in one axis numerically illustrating a scaling process.

Referring now to FIG. 5, a letter "E" is subject to transformation at a scale factor of 1/100 (in this illustration we are concerned with the coordinate system values along the "Y" axis, one of ordinary skill in the art can appreciate that the following is applicable in the "X" axis also). The "E" character is represented at full scale by "X" and "Y" component values in accordance with the first, high resolution coordinate system. FIG. 5 illustrates that the horizontal strokes of the letter "E" are represented in the "Y" axis by outline features falling at 0 and 80 for the lower horizontal stem, 365 and 445 for the middle horizontal stem and, 607 and 687 for the upper horizontal stem, each stem being 80 units or pixels wide at full scale. Illustrating a transformation by a scale factor of 1/100 (representative of a transformation from a matrix having 100 units to a second matrix having 1 unit per every 100 units of the first matrix), the same character features are represented by scaled values of 0 and 0.8 for the first horizontal stem, 3.65 and 4.45 for the second horizontal stem and, 6.07 and 6.87 for the upper horizontal stem. The decimal portion of each coordinate value represents a fractional amount by which each coordinate value deviates from a full pixel.

The scaled values are processed according to rounding rules in order to bring the scaled coordinate into conformance with the second or lower resolution grid. The rounding rules applied are: anything greater than or equal to 0.5 rounds up to the next integer pixel, while anything less than 0.5 rounds down. For negative values, anything less than or equal to −0.5 rounds up to the integer pixel closer to 0 and anything greater than −0.5 rounds down to the next higher negative integer pixel away from 0. The rounding rules result in one more or one less pixel being activated per specific coordinate and they produce a fraction pixel error (the difference between the actual scaled value and the rounded value) which numerically represents the deviation of the scaled outline point from the true contour point.

As can be seen from the rounding values in FIG. 5, the lower horizontal stem will be defined as a row of pixels corresponding to the 0 X-coordinates and a row of pixels corresponding to the 1 X-coordinates. The second horizontal stem, because of the application of rounding rules, will be represented only as a single row of pixels corresponding to the 4 X-coordinates. The upper horizontal stem, like the lower horizontal stem is defined by two rows of pixels corresponding to the 6 X-coordinates and the 7 X-coordinates. Rounding has resulted in a deviation from the true outline at the higher resolution, as represented by the fractional pixel errors.

The middle stem can be properly rasterized by shifting the coordinate space where the row of pixels was "stolen" from the middle stem by rounding. The coordinate space can be shifted in this case by clearing the fractional pixel error at an edge of the middle stem. Clearing is effected by subtracting out the error (−0.35) leaving 0 error at the lower outline stroke or edge of the middle stem, locking that edge and creating in effect a new origin from which to rasterize the middle stem. In order to preserve the rasterization of the upper stem, the error must be added back to assure that the upper stem is rasterized in an unshifted manner. The lower horizontal stem is already "edge locked" to the origin (0) where there is no error and therefore requires no coordinate space shift. Thus, the technique of grid correcting the middle stem through error manipulation is implemented as a set of instructions that provide for saving the error encountered at the lower edge of the middle stem, subtracting the error from that position to effect a new origin and adding the error back into the top edge of the middle stem before rasterizing it and the upper stem.

Figure 5A:
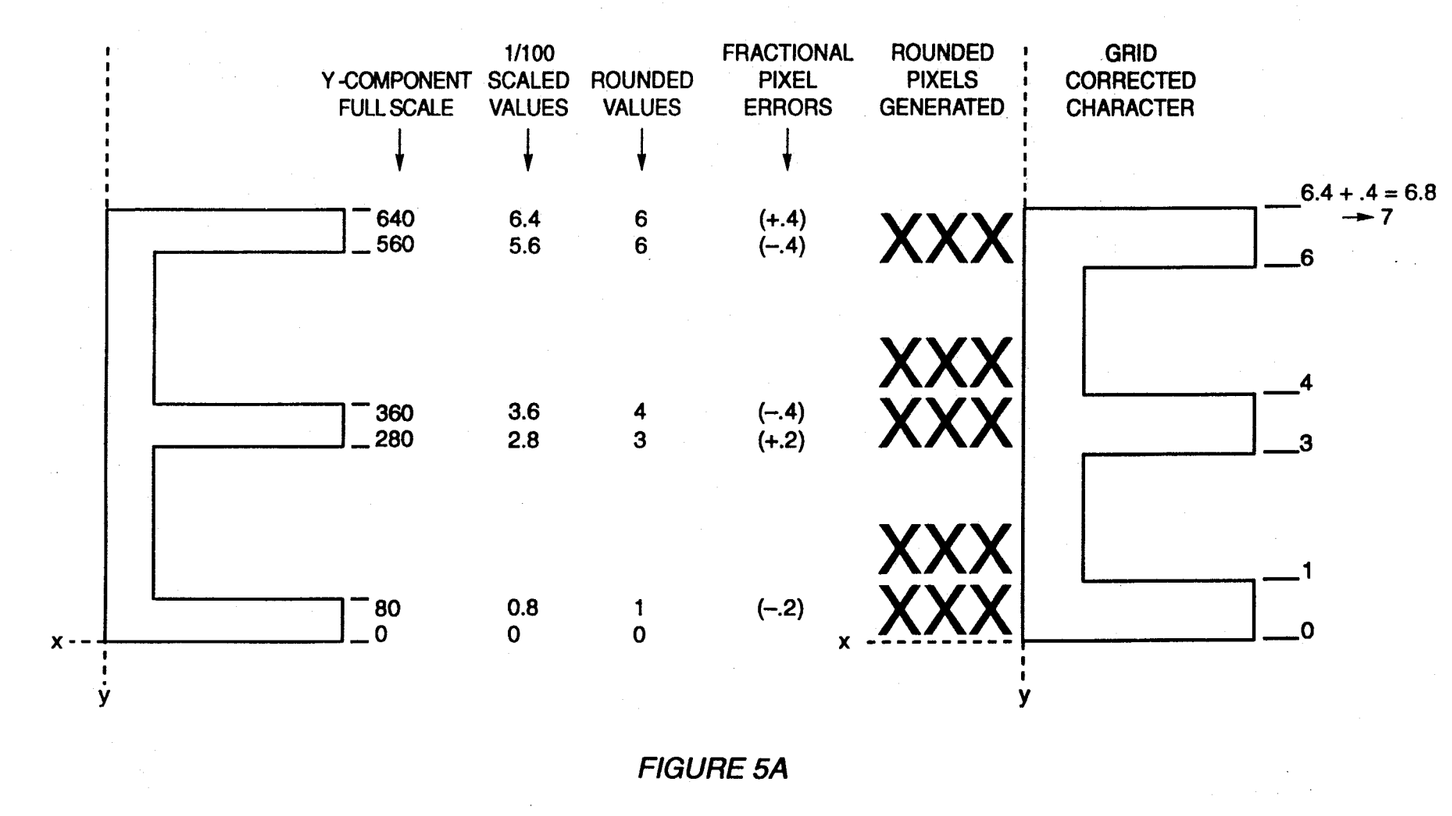
FIG. 5A is another character coordinate representation in one axis numerically illustrating a scaling process.

Referring now to FIG. 5A, a similar example shows a different letter "E" subject to transformation at a scale factor of 1/100 (this description pertains to the "Y" axis but one skilled in the art can apply these teachings to the "X" axis as well). This second letter "E" is analyzed in more detail in connection with FIGS. 7A–7D. The "E" character is represented at full scale by "X" and "Y" component values in accordance with the first, high resolution coordinate system. FIG. 5A illustrates that the horizontal strokes of the letter "E" are represented in the "Y" axis by outline features falling at 0 and 80 for the lower horizontal stem, 280 and 360 for the middle horizontal stem and 560 and 640 for the upper horizontal stem, each stem being 80 units or pixels wide at full scale. Illustrating a transformation by a scale factor of 1/100, the same character features are represented by scaled values of 0 and 0.8 for the lower horizontal stem, 2.8 and 3.6 for the middle horizontal stem and 5.6 and 6.4 for the upper horizontal stem. The decimal portion of each coordinate value represents a fractional amount by which each coordinate deviates from a full pixel.

After rounding, these values become 0, 1 (with a deviation or error of −0.2), 3 (−0.2), 4 (−0.4), 6 (−0.4) and 6 (+0.4). The unmodified "E" would thus be represented by stems of two, two and one pixel thickness for the lower, middle and upper horizontal stems, respectively. However, if the lower edge of each stem is locked and the fractional pixel error is cleared, then each of the horizontal stems will be represented by the same number of pixels, in this case two.

Figure 6:
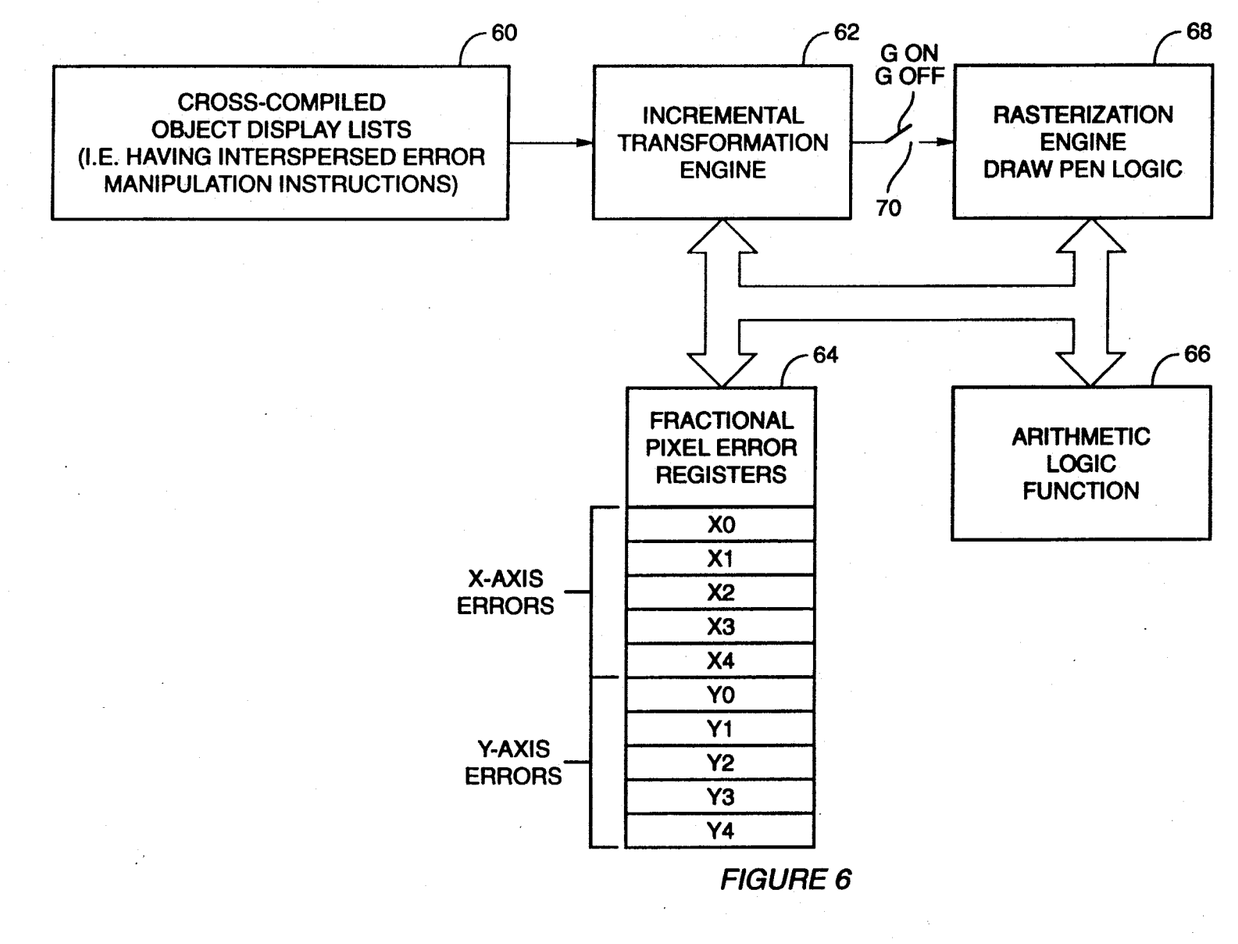
FIG. 6 is a block diagram of the grid correction technique according to the invention implementing registers.

A system to effect such an implementation is illustrated in FIG. 6. As illustrated, the cross-compiled object display lists 60, which are the digital master code processed by a font translation unit to intersperse fractional pixel error manipulation instructions in the outline data of the font characters, are shipped to the incremental transformation engine 62 for scaling. The scaling operation generates rounded integer pixel values and fractional pixel errors, as discussed relative to FIG. 5. The fractional pixel errors are stored, when necessary for adjusting object features in accordance with the manipulation instructions in the character outline, in a set of registers 64. Each axis has its own set of registers for storing errors associated with that axis. The registers 64 may be dedicated error registers or preferably they may be a general purpose register file, each having software controlled responsibility for keeping track of errors associated with a particular axis. The number of registers available may determine the maximum number of features in an axis that can be controlled by manipulating fractional pixel errors.

The error registers 64 are also in communication with an arithmetic logic unit or function 66 and a rasterization engine 68. The arithmetic logic function 66 performs the adding and subtracting of fractional pixel errors with a fractional pen position indicated by the rasterization engine pen logic 68. Fractional pixel errors are combined with the pen position by add or subtract commands performed by the arithmetic logic function 66. Pen position is an indication of where the rasterization engine is in a sequence of draw operations to construct an object or character outline. As a character is drawn pen logic may be at a point where a rule must be applied to preserve the typographic appeal of the character being drawn. At that point the fractional pixel error saved will be added to or subtracted from the pen position to implement the rule and desired typographic effect, before further rasterization of the outline.

Figure 7A:
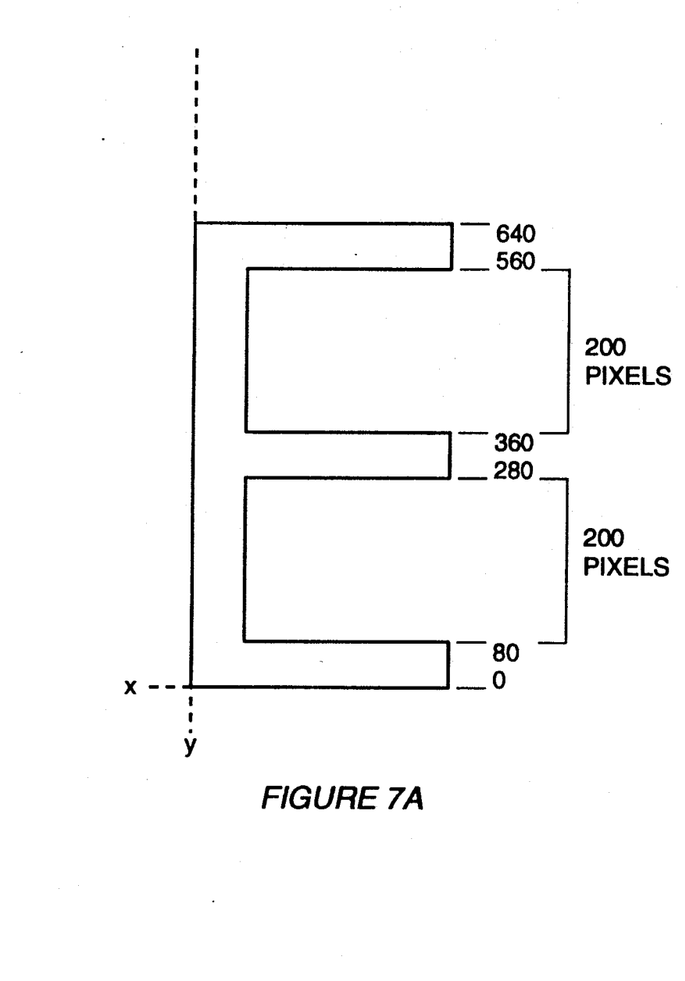
FIG. 7A is an illustration of controlling multiple character features using grid correction according to the invention.
Figure 7B:
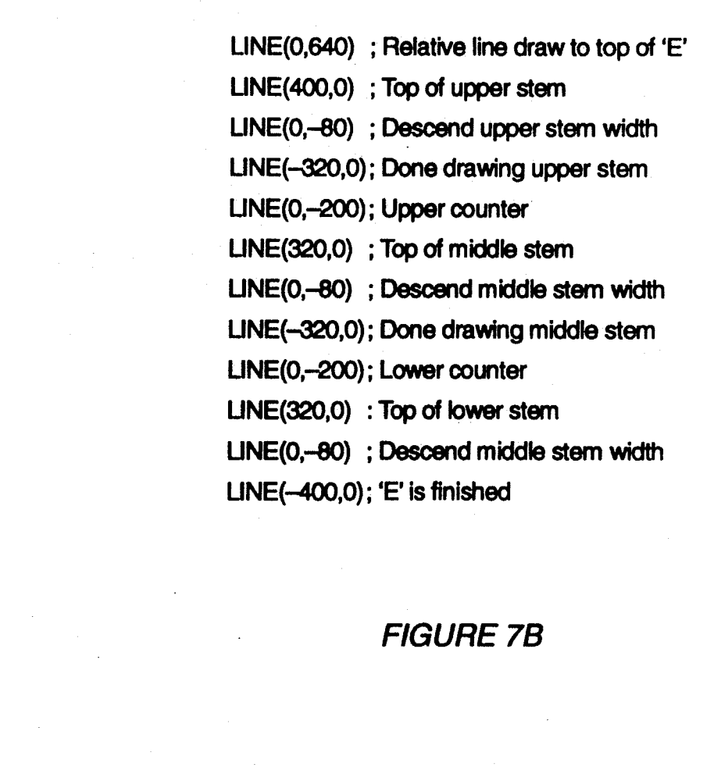
FIG. 7B is a computer program listing for generating the character of FIG. 7A without grid correction according to the invention.

The example of how to maintain a single stem width of the letter "E" at a scale factor of 1/100 was discussed hereinbefore with respect to FIG. 5. In that example, it was only necessary to correct the middle stem with no concern for other character features. See also FIG. 5A in which the upper stem was corrected. A more sophisticated example illustrates that it may be desirable, and is possible using grid correction according to the invention, to maintain multiple features of a character. Using "E" for illustration purposes and referring now to FIG. 7, it may be desirable to maintain both the stroke width and counters of the character illustrated (counters being the white space between the horizontal stems). The maintenance of these character features might be desired to preserve vertical aspects of the character (i.e., character height) because of aesthetic considerations relative to this particular font at a particular scale factor.

The three stems of, the character "E" as originally rasterized (i.e., in the digital master) have Y-coordinate values as indicated in FIG. 7A. Assume that it is desirable to maintain the proportionality of the 80 pixel stem widths and the 200 pixel counter widths (i.e., maintain all horizontal features), for aesthetic reasons. The code for drawing the original, assuming no degradation during scaling, is presented in FIG. 7B. This code implementing relative line drawing, first strokes up the leftmost outline of the "E", then outlines in descending succession the upper, middle and lower stems.

Assuming that scaling by any scale factor would degrade the critical proportionalities of the character, the character proportions can be maintained by shifting a coordinate space relative to features to be controlled, as was done in FIG. 5. In this case, it is possible to control five features of the character by locking two edges. A first "shift", to define a new origin by subtracting out fractional pixel error, will control proper rasterization of the lower counter and the middle stem. A second "shift" will control the upper counter and the top stem. The lower stem is controlled by default since one edge is locked at zero on the Y-axis without any error.

Figure 7C:
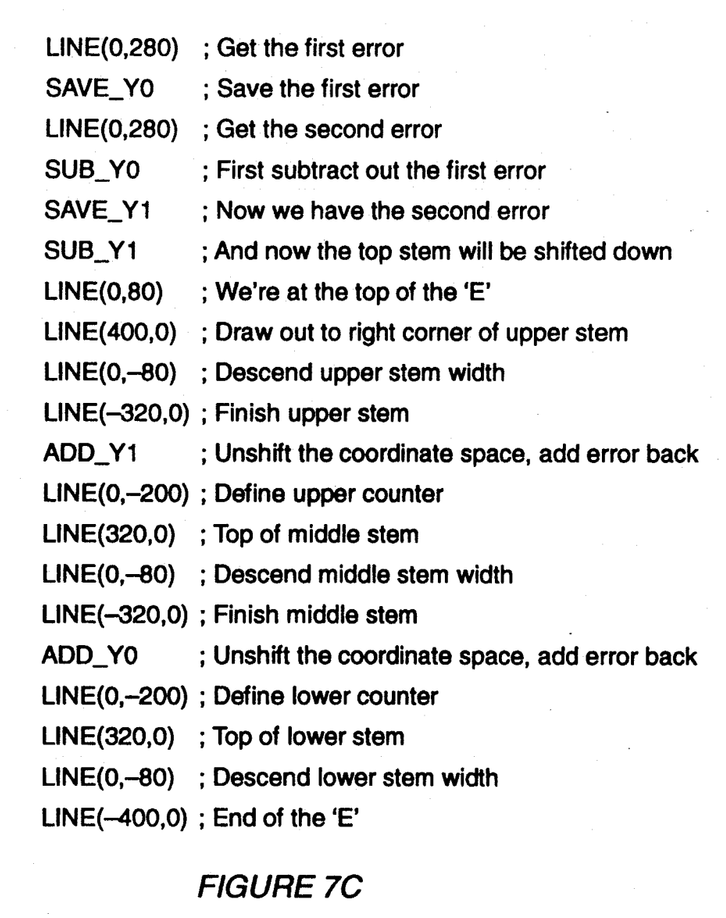
FIG. 7C is a computer program for generating the character of FIG. 7A with fractional pixel error manipulation according to the invention.

FIG. 7C presents the code incorporating instructions to perform the fractional pixel error saves, subtracts and adds which are all that is necessary to control proper character rasterization. Such code is analogous to an object display list comprising outline features and error manipulation instructions. Obviously, "save_Y_" means save an error to the Y register indicated; "sub_Y_" means subtract the error saved in a Y register from present fractional pen position; and "add_Y_" means add the error saved in the specified Y register to the present fractional pen position as indicated by draw pen logic.

As indicated in FIG. 7C the first instruction directs a vector to a point (280) where the first edge to be locked is located (again, locking the lower edge of the middle stem permits control of both the lower counter and the middle stem). At that point the fractional pixel error is saved. A vector to the second edge to be locked (280+280=560) permits saving of the fractional pixel error resulting at the lower edge of the upper stem (which will control both the upper counter and stem). Before saving the upper stem lower edge error, and at least before rasterizing any other character features, the pixel error saved relative to the first edge to be locked and features to be controlled is subtracted to maintain the relationship between those features (i.e., the lower counter and middle stem).

Figure 7D:
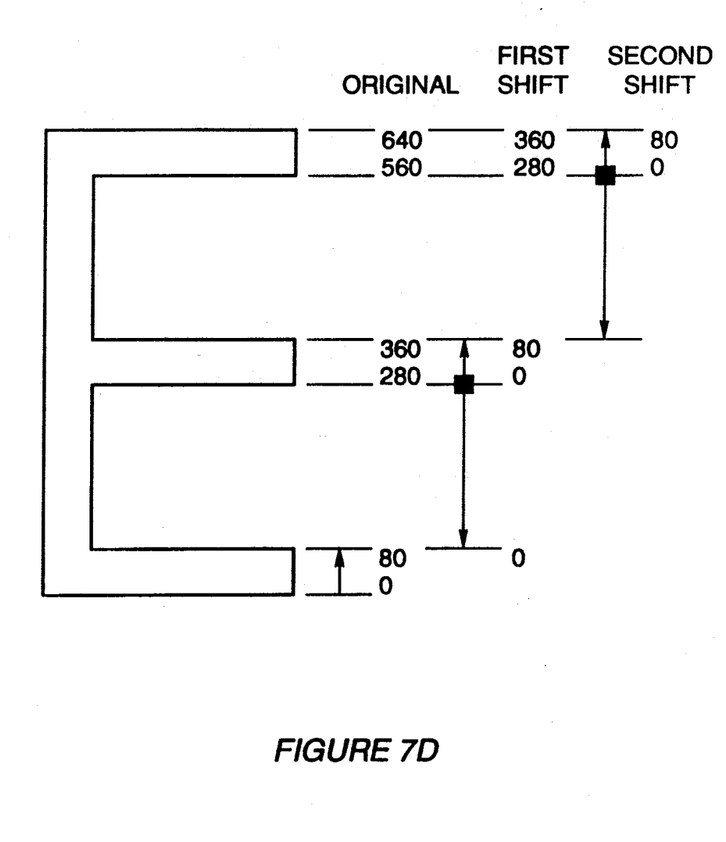
FIG. 7D is the character of FIG. 7A illustrating the coordinate shifting and edge locking according to the invention.

Then, the second error can be subtracted out, shifting the coordinate position and locking the lower edge of the upper stem to control the proportionality of the upper counter and upper stem. At that point a line is rasterized to the top left corner of the "E" (by the "Line (0,80)" instruction) and the remainder of the character can be drawn from the top down establishing the coordinate shifts and maintaining character features as illustrated in FIG. 7D.

The implementation described (see FIG. 6) is sequential, whereby as a character feature is interpreted for drawing it is processed by the incremental transformation engine and, therefore, the most efficient way of fetching the error at a location to perform a subsequent edge locking of a feature by manipulating the error, is to intersperse the error fetch (i.e., vector and save) with the drawing of the character. It is critical to the maintenance of features by edge locking that the error be manipulated prior to drawing the character feature that is to be controlled by the edge locking.

It is also necessary, as the character is being drawn, preferably in a pipelined manner, that the pixel errors be added back because the accumulation of the fractional errors removed during nested coordinate shifting/edge locking adjustment may cause the total height of the character to change. If the net error terms discarded were positive then the character may be shorter (i.e., lost pixels). If the net error terms discarded were negative then the character may be taller (i.e., extra pixels). Adding the subtracted pixel errors back can assure that the controlled feature (height in this case) does not change (net pixel change=zero). In addition, if the pixel errors are not added back the character path may not close. However, the subtracted pixels or errors must be added back in an appropriate place referred to as a "dump zone", which should not impact the features controlled by the edge locking. Identifying appropriate dump zones is a matter of aesthetic significance and may be a matter of compromising certain features for those preserved. For instance, the height and weight of a character may be preserved while sacrificing a counter (white space) by making it a dump zone for accumulated fractional pixel errors. The best dump zone is a place where the error is zero because no pixels will be generated.

Figure 8A:
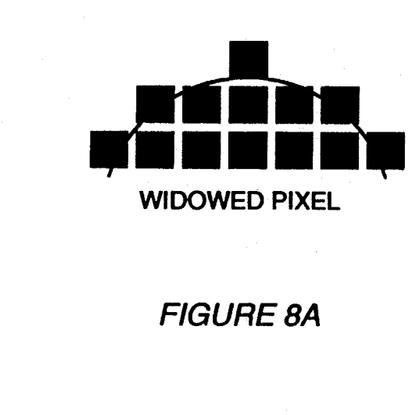
FIG. 8A is an illustration of a windowed pixel resulting from an improperly scaled curve.
Figure 8B:
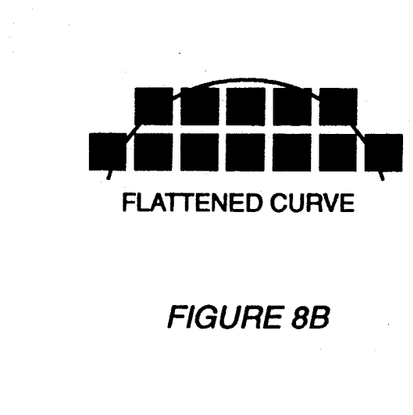
FIG. 8B is an illustration of a flattened curve resulting from lack of grid correction.
Figure 8C:
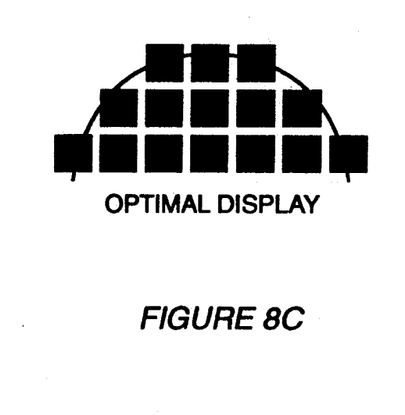
FIG. 8C is an optimal curve resulting from apogee locking and fractional pixel error manipulation according to the invention.

The manipulation of fractional pixel errors may also be used to preserve the aesthetic appeal of curved features of a character. This technique referred to as apogee locking, involves the same saving, subtracting and adding of fractional pixel errors as discussed hereinbefore with respect to lines. If an arc or curve is rasterized in a manner such that the apogee of the arc or curve barely generates a pixel, the pixel becomes windowed as in FIG. 8A. If an arc or curve is rasterized in a manner such that the apogee of the arc is shy of generating a pixel then the arc can become flattened as in FIG. 8B. The optimal curve shape, as in FIG. 8C, can be attained if the error at the apogee of the curve is forced to zero by the techniques discussed hereinbefore. However, because an error is not fetched until a vector is drawn to a particular point, it becomes necessary to provide a facility or instruction whereby a vector can be executed without the consequent sequential rasterization of the vector. In this manner an error can be fetched prior to drawing the feature to be controlled (line, arc, curve, etc.).

Referring back to FIG. 6, a switching means is illustrated to represent a means for decoupling the transformation engine from the rasterization engine. Such a means for decoupling, either a make or break switch or preferably a software control bit or instruction enables the fetching of the fractional pixel error at the curve apogee while the rasterization engine is decoupled. The transformation engine can then be instructed to vector back to the appropriate starting point for rasterizing the curve to the apogee where the error is manipulated to zero by the technique discussed hereinbefore. Aesthetic considerations relative to type design require that the point along the curve where the error is to be subtracted and added back according to the invention, be carefully chosen in order to maintain character and font integrity.

Although only add, subtract and save operations are discussed herein to correct curves and straight strokes, other instructions or combinations of fractional pixel error manipulation instructions are conceivable to produce various graphic effects. For instance, a subtract instruction can be effected by clearing registers or a multiply instruction might be effected to perform a series of adds with a single command. Further, it is conceivable that graphic features other than stroke weight, curve and line smoothness and length can be affected by fractional pixel error manipulation according to the invention. Additionally, although the invention has been disclosed with respect to manipulating errors in a single axis, the invention is certainly applicable to two- or three-dimensional graphics systems and it is conceivable that grid correction according to the invention could be applied to N-axes.

While five error registers are discussed herein relative to each axis, one of ordinary skill in the art will appreciate that it may be desirable to have greater or fewer registers associated with each axis depending on the application. For example, in applications where a font being processed has more critical vertical aesthetic features, such as non-Latin fonts, it would be desirable to have more registers for nesting manipulations of interrelated features in the Y-axis while optimizing resources by having fewer registers for manipulation in the X-axis.

Furthermore, while dedicated hardware error registers are disclosed for saving fractional pixel errors, one of ordinary skill in the art will appreciate that the hardware registers could be replaced or additional registers could be emulated with instruction traps and software emulation. Also, a general purpose register file could be used and software would track which register controls which axis.

Rounding is disclosed as a necessary process in practicing grid correction according to the invention, however the rounding rules applied herein are an optimization and could be dispensed with by substituting truncation or a different set of rounding rules.

While it has been disclosed that errors are mathematically manipulated one at a time in sequence, one of ordinary skill in the art will appreciate that a series of errors can be manipulated in conjunction.

Although the invention has been shown and described with respect to an illustrative embodiment thereof, it should be understood by those skilled in the art that the foregoing and various other changes, omissions and additions in the form and detail thereof may be made without departing from the spirit and scope of the invention as delineated in the claims.

What is claimed is:

1. A method of grid correcting a digital representation of a graphic object provided by a digital master for transformation from conformance with a high resolution grid to conformance with a lower resolution grid relative to a raster output device, said method comprising the steps of:

translating with cross compilation said digital master into an object display list comprising a plurality of correction instructions and a plurality of object descriptions, one of said object descriptions including a first limit of a stem and a second of said object descriptions including a second limit of said stem;

transferring said object display list to a font processor;

processing said object display list according to a method comprising the steps of:

transforming said plurality of object descriptions to generate a scaled description comprising a plurality of integer descriptors and a corresponding plurality of fractional descriptors;

rounding said scaled description to generate a second plurality of fractional descriptors and a plurality of related integer descriptors;

calculating a first error comprising a first fractional descriptor for said object description for said first limit of said stem;

generating an outline description using said second plurality of integer descriptors and using selective mathematical manipulation of said second plurality of fractional descriptors including applying said first error to adjust said second object description; and filling said outline description for output by said raster output device as an graphic object.

2. The method of claim 1 wherein the step of generating an outline description comprises:

drawing a vector using a rasterization engine and storing a fractional pen position indicating a position of the vector and using said fractional pen position and a transformation engine, connected to said rasterizing engine, to subtract said first error from a first scaled value and to add said first error to a second scaled value; and selectively decoupling said rasterization engine from said transformation engine to process said object display list without drawing a vector during said decoupling.

* * * * *